May 14, 1929. T. G. STILES 1,713,060
RAIL BRACE
Filed March 27, 1928
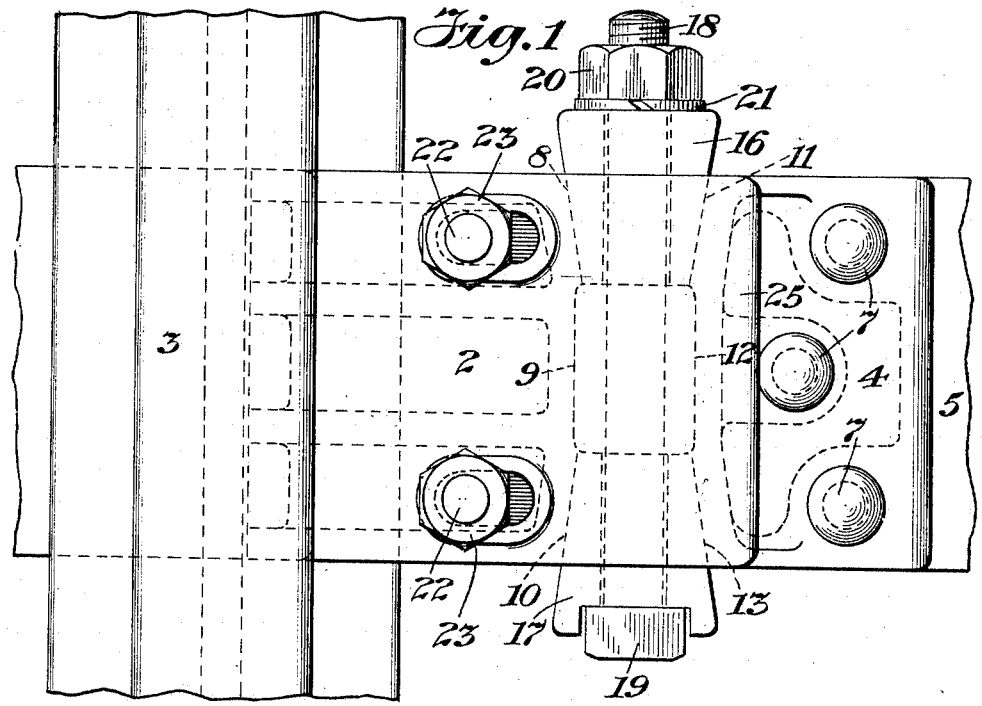
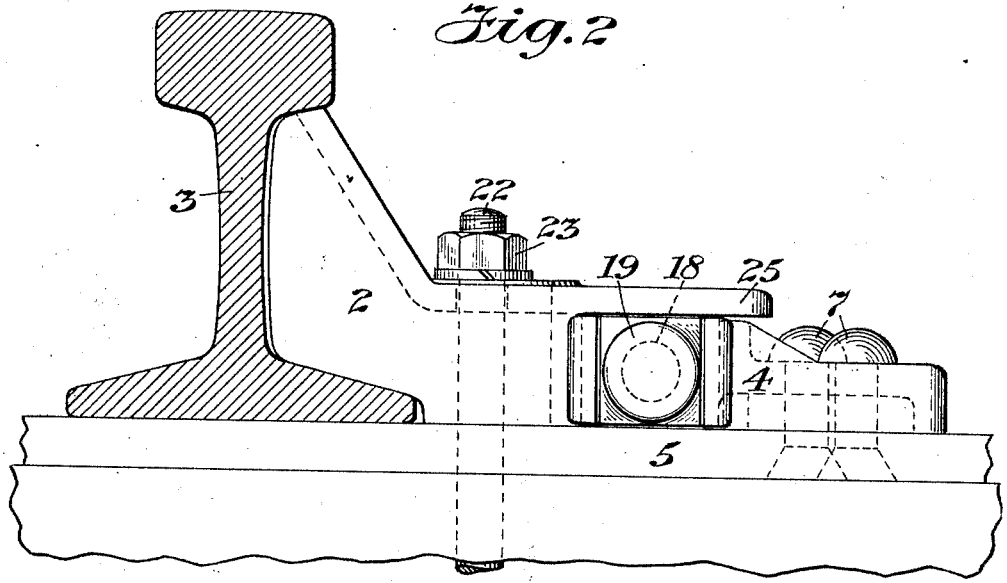
INVENTOR
Thomas George Stiles
BY
HIS ATTORNEY Patented May 14, 1929.

1,713,060

UNITED STATES PATENT OFFICE.

THOMAS GEORGE STILES, OF ARLINGTON, NEW JERSEY.

RAIL BRACE.

Application filed March 27, 1928. Serial No. 265,113.

This invention relates to rail braces and more particularly to rail braces of the type disclosed in Letters Patent No. 1,230,534, granted to me June 19, 1917.

The rail brace of my aforesaid patent comprises a rail-engaging member supported on a tie-plate or other support for adjustment in a direction crosswise of the rail, a second member mounted on the tie-plate or other support in fixed relation thereto, and a wedge device interposed between the opposing faces of said members and operative for forcing the rail-engaging member against the adjacent rail to locate the latter in desired position and thereafter firmly holding the same in such position. As a means for maintaining the wedge device in its operative position between the said members, the latter are undercut on their adjacent or opposing faces to provide a channel or key-way between the same in which the wedge is received and maintained. Because of the adjustability of the rail-engaging member with respect to the opposing or resistance member, however, there is left an open space between the members at a point above the wedge device which permits of the entry of dirt, snow and other foreign matter into the wedge housing channel or key-way between the members which obviously interferes with the desired manipulation of the wedge in the way of adjustment, removal, etc. Because of such objection incident to this open top of the wedge housing channel or key-way, it has been the object of my present invention to improve the rail brace by the provision of a closed top for said channel or key-way which will permit of all necessary adjustments of the parts as heretofore. This object I attain by the novel construction and arrangement of parts hereinafter described and claimed and as illustrated in the accompanying drawings, in which—

Fig. 1 is a plan of my improved rail brace in operative relation to a section of rail, and Fig. 2 is an end elevation of the same.

Similar reference characters indicate like parts in both figures of the drawings.

The rail-engaging member, indicated at 2, is here shown as adapted for engagement with a stock rail 3, which is mounted in usual manner on a tie-plate 5 carried on an ordinary railroad tie. This member 2 is slidably mounted on the tie-plate for adjustment in a direction crosswise or transversely of the rail. For cooperation with the adjustable member 2 is a fixed member, indicated at 4, here shown as fixedly attached to the tie-plate 5 in a position opposite the member 2 by suitable fastening means, such as rivets 7.

The member 2, as hereinbefore referred to, is intended to have movement relative to the member 4 in a direction crosswise of the rail for the purpose of locating and holding the rail in any desired adjusted position, and this function is obtained, as here shown, by providing a pair of wedges between the members 2 and 4. The adjacent faces of said members, as in the device of my aforesaid patent, are so shaped as to form between them a channel or key-way of substantially hourglass form when viewed in plan. The outline of this channel or key-way is indicated in the member 2 by the reference numerals 8, 9 and 10, and in the member 4 by corresponding reference numerals 11, 12 and 13.

In the angular channel thus formed I place the means for adjusting the member 2 crosswise of the rail. The means employed comprises a pair of oppositely facing wedges, such as 16 and 17, and suitable means for supporting them in place in the channel and maintaining them in any desired position of adjustment with respect to each other. The construction shown is one in which two wedges, substantially oblong in cross-section, are bored to receive a tie-bolt, such as 18, the head 19 of which constitutes a resistance point or stop for locating and also for actuating the wedge 17, while the other end of said tie-bolt is passed through a corresponding bore in the wedge 16 and has suitable means of any well known kind, such as a nut 20 and a split washer 21, for holding the parts in place after the proper adjustment has been made. The two wedges or wedge blocks 16 and 17 substantially fit the tapered portions of the key-way, the sides of which are defined by the walls 8—10 and 11—13, and it will be obvious that when the nut 20 is tightened to bring the wedge blocks 16 and 17 closer together, the member 2 will be moved crosswise of the rail owing to the fact that the member 4 which cooperates therewith is a fixture. The movement will of course be sufficient to locate the rail 3 in its proper position crosswise of the track, and to hold it firmly in place. After the desired adjustment has been obtained, the member 2 may be securely fastened to the tie-plate on which it is mounted by any suitable means, such as the bolts 22 passing through the member 2 and through the tie-plate 5 and tie 6 and securely held by nuts 23.

As hereinbefore referred to, the channel or key-way between the adjacent faces of the members 2 and 4 is formed, in the brace of my aforesaid patent, by undercutting said faces, whereby an overlying ledge is formed at the upper edge of each member, the adjacent edges of which ledges are spaced apart in order to permit of the adjustment of the rail-engaging member 2 relatively to the fixed or resistance member 4, and which spacing apart of the ledges permitted of the entry of dirt, snow and other foreign matter into the channel. In accordance with my present invention, I provide one of the members with a flange which extends therefrom at a point adjacent its inner upper edge to a point somewhat beyond the inner upper edge of the opposing member and completely overlying the intervening space or channel between the members. This flange, indicated at 25, may extend from either one of the members to a point beyond the adjacent face of the opposing member, but preferably and as here shown it is formed integral with the member 2 and extends therefrom beyond the adjacent face of the member 4 in close relation to its upper edge, as best shown in Fig. 2. The extent to which the outer edge of the flange 25 extends beyond the member 4 may vary more or less, but in any event it should be of sufficient length to completely overlie the channel between the members as a cover therefor while permitting of any desired or necessary adjustment of the movable member 2 with respect to the fixed member 4. With a cover thus provided for the channel between the members, such channel is kept clean and free from foreign matter and the wedging device housed therein is always in condition to be readily adjusted or otherwise manipulated.

What I claim is:

A rail brace comprising an adjustable rail engaging member, an opposing member in spaced relation to the first member providing a channel therebetween, the opposing faces of said members being provided with oppositely inclined wedging surfaces, a pair of spaced oppositely facing wedges positioned in the channel between the coacting inclined faces of the two members, and means extending laterally beyond said channel for engaging said wedges and moving the same relatively to each other, one of said members being provided with an unbroken flange projecting beyond the adjacent face of the opposing member and overlying the intervening channel as a cover therefor.

In testimony whereof I affix my signature.

THOMAS GEORGE STILES.